(12) United States Patent
Murakami et al.

(10) Patent No.: US 7,995,912 B2
(45) Date of Patent: Aug. 9, 2011

(54) IMAGING APPARATUS WITH STROBE CONSECUTIVE SHOOTING MODE AND OPTIONAL PIXEL ADDITION DRIVE

(75) Inventors: Tomohiko Murakami, Kokubunji (JP); Yoshiyuki Kato, Higashiyamato (JP); Takeshi Sato, Tachikawa (JP)

(73) Assignee: Casio Computer Co., Ltd., Tokyo (JP)

( * ) Notice: Subject to any disclaimer, the term of this patent is extended or adjusted under 35 U.S.C. 154(b) by 0 days.

(21) Appl. No.: 12/720,323

(22) Filed: Mar. 9, 2010

(65) Prior Publication Data

US 2010/0165181 A1 Jul. 1, 2010

Related U.S. Application Data

(62) Division of application No. 11/635,949, filed on Dec. 8, 2006, now Pat. No. 7,835,639.

(30) Foreign Application Priority Data

Dec. 9, 2005 (JP) .................................. 2005-355964

(51) Int. Cl.
*G03B 15/05* (2006.01)
(52) U.S. Cl. ..................... 396/164; 396/167; 348/371
(58) Field of Classification Search ................... 396/108
See application file for complete search history.

(56) References Cited

U.S. PATENT DOCUMENTS

| | | | |
|---|---|---|---|
| 5,168,300 A | 12/1992 | Yasukawa | |
| 5,371,568 A | 12/1994 | Takagi et al. | |
| 5,499,075 A | 3/1996 | Sato et al. | |
| 6,167,202 A | 12/2000 | Fukui | |
| 6,404,987 B1 * | 6/2002 | Fukui | ............................... 396/56 |
| 6,560,412 B2 | 5/2003 | Iwasaki | |
| 6,657,672 B1 | 12/2003 | Okamura | |
| 7,359,632 B2 | 4/2008 | Tohyama | |
| 7,379,115 B2 | 5/2008 | Ichikawa et al. | |

(Continued)

FOREIGN PATENT DOCUMENTS

JP 05-044654 B 7/1993

(Continued)

OTHER PUBLICATIONS

Japanese Office Action dated Jul. 28, 2009 (3 pages), and English translation thereof (3 pages), issued in counterpart Japanese Application Serial No. 2005-355964.

(Continued)

*Primary Examiner* — Clayton E Laballe
*Assistant Examiner* — Bret Adams
(74) *Attorney, Agent, or Firm* — Holtz, Holtz, Goodman & Chick, PC (57) ABSTRACT

When the mode is set to a strobe consecutive shooting mode, an imaging apparatus sets the mode to a pixel addition drive mode for reading out image data using pixel addition drive, performs metering operation using preliminary flashing and calculates an appropriate amount of flashing on the basis of the metering operation. Next, the imaging apparatus judges whether or not it is possible to flash three times consecutively with the calculated amount of flashing. If it is judged that it is not possible to flash three times consecutively with the calculated amount of flashing, the imaging apparatus limits the amount of flashing to the largest amount of flashing within the range of amounts of flashing with which flashing of strobe light three times consecutively is possible, and performs strobe consecutive shooting with the limited amount of flashing.

8 Claims, 7 Drawing Sheets

U.S. PATENT DOCUMENTS

| | | |
|---|---|---|
| 7,433,589 B2 * | 10/2008 | Odaka ............................ 396/155 |
| 7,486,884 B2 | 2/2009 | Okuno et al. |
| 7,509,042 B2 | 3/2009 | Mori et al. |
| 7,702,234 B2 * | 4/2010 | Tokiwa et al. ................ 396/155 |
| 2002/0154910 A1 | 10/2002 | Iwasaki |
| 2004/0125220 A1 | 7/2004 | Fukuda et al. |
| 2005/0179810 A1 | 8/2005 | Okamura |
| 2007/0025718 A1 | 2/2007 | Mori et al. |
| 2008/0055454 A1 | 3/2008 | Yumiki |
| 2008/0124067 A1 | 5/2008 | Eliasson |

FOREIGN PATENT DOCUMENTS

| | | |
|---|---|---|
| JP | 05-167910 A | 7/1993 |
| JP | 05-188438 A | 7/1993 |
| JP | 09-061904 A | 3/1997 |
| JP | 2000-066275 A | 3/2000 |
| JP | 2002-185860 A | 6/2002 |
| JP | 2003-270702 A | 9/2003 |
| JP | 2005-275581 A | 10/2005 |
| JP | 2005-303519 A | 10/2005 |

OTHER PUBLICATIONS

"CGSD—Gamma Correction Explained" dated Jul. 4, 1997; obtained from http: \\web.archive.org/web/19970704072109/http://www.cgsd.com/papers/gamma_intro.html.

* cited by examiner

| | CORRECTION COEFFICIENT |
|---|---|
| FIRST | 1.00 |
| SECOND | 1.18 |
| THIRD | 1.36 |

FIG. 5B

| | CORRECTION COEFFICIENT |
|---|---|
| FIRST | 1.00 |
| SECOND | 0.70 |
| THIRD | 0.30 |

IMAGING APPARATUS WITH STROBE CONSECUTIVE SHOOTING MODE AND OPTIONAL PIXEL ADDITION DRIVE

CROSS-REFERENCE TO RELATED APPLICATION

The present application is a Divisional Application of U.S. application Ser. No. 11/635,949 filed Dec. 8, 2006, now U.S. Pat. No. 7,835,639 which is based upon and claims the benefit of priority from the prior Japanese Patent Application No. 2005-355964 filed on Dec. 9, 2005, the entire contents of which are incorporated herein by reference.

BACKGROUND OF THE INVENTION

1. Field of the Invention

The present invention relates to an imaging apparatus and an imaging method, and specifically to an imaging apparatus and an imaging method for shooting an object by flashing strobe light.

2. Description of the Related Art

In an imaging apparatus, for example, a digital camera, of recent years, strobe light needs be flashed for each shooting in the case where an object is to be shot consecutively in a dark condition.

However, if strobe light is consecutively flashed, the voltage accumulated in a capacitor decreases. Accordingly, exposure sufficient for shooting cannot be obtained.

Therefore, an art has appeared for performing strobe shooting for a flash time corresponding to a time code and a number of consecutive shootings and compensating insufficiency in the amount of exposure by increasing the gain.

SUMMARY OF THE INVENTION

In accordance with an aspect of the present invention, there is provided an imaging apparatus comprising: an image pickup element for converting light of an object to image data; a strobe for flashing and firing light; a shooting unit which performs strobe shooting using the image pickup element and the strobe; a calculation unit which calculates an amount of flashing of the strobe with which appropriate exposure is obtained during the strobe shooting performed by the shooting unit; a judgment unit which judges whether or not it is possible for the strobe to flash consecutively for a certain number of times with the amount of flashing calculated by the calculation unit; and a shooting control unit which has the shooting unit execute consecutive strobe shooting for the certain number of times with the amount of flashing with which consecutive flashing for the certain number of times is possible, and has the shooting unit drive the image pickup element by pixel addition, in the case where it is judged by the judgment unit that consecutive flashing by the strobe for the certain number of times with the amount of flashing calculated by the calculation unit is not possible.

In accordance with another aspect of the present invention, there is provided an imaging apparatus comprising: an image pickup element for converting light of an object to image data; a strobe for flashing and firing light; a shooting unit which performs strobe shooting using the image pickup element and the strobe; a setting unit which sets a strobe consecutive shooting mode in which strobe shooting is consecutively executed by the shooting unit; and a shooting control unit which has the shooting unit drive the image pickup element by pixel addition, in the case where the strobe consecutive shooting mode is set by the setting unit.

In accordance with another aspect of the present invention, there is provided an imaging method comprising: a shooting step of performing strobe shooting using an image pickup element for converting light of an object to image data and a strobe for flashing and firing light; a calculation step of calculating an amount of flashing of the strobe with which appropriate exposure is obtained during the strobe shooting performed by the shooting step; and a judgment step of judging whether or not it is possible for the strobe to flash consecutively for a certain number of times with the amount of flashing calculated by the calculation step; wherein, the shooting step executes consecutive strobe shooting for the certain number of times with the amount of flashing with which consecutive flashing for the certain number of times is possible, and drives the image pickup element by pixel addition, in the case where it is judged by the judgment step that consecutive flashing by the strobe for the certain number of times with the amount of flashing calculated by the calculation step is not possible.

According to the present invention, since imaging elements are driven by pixel addition, it is possible to prevent the image quality from being deteriorated during strobe consecutive shooting.

The above and further objects and novel features of the present invention will more fully appear from the following detailed description when the same is read in conjunction with the accompanying drawings. It is to be expressly understood, however, that the drawings are for the purpose of illustration only and are not intended as a definition of the limits of the invention.

DETAILED DESCRIPTION OF THE PREFERRED EMBODIMENTS

Hereinafter, the preferred embodiments of the present invention will be described with reference to the drawings as an example of application of an imaging apparatus of the present invention to a digital camera.

A. First Embodiment

A-1. Configuration of the Digital Camera

Figure 1:
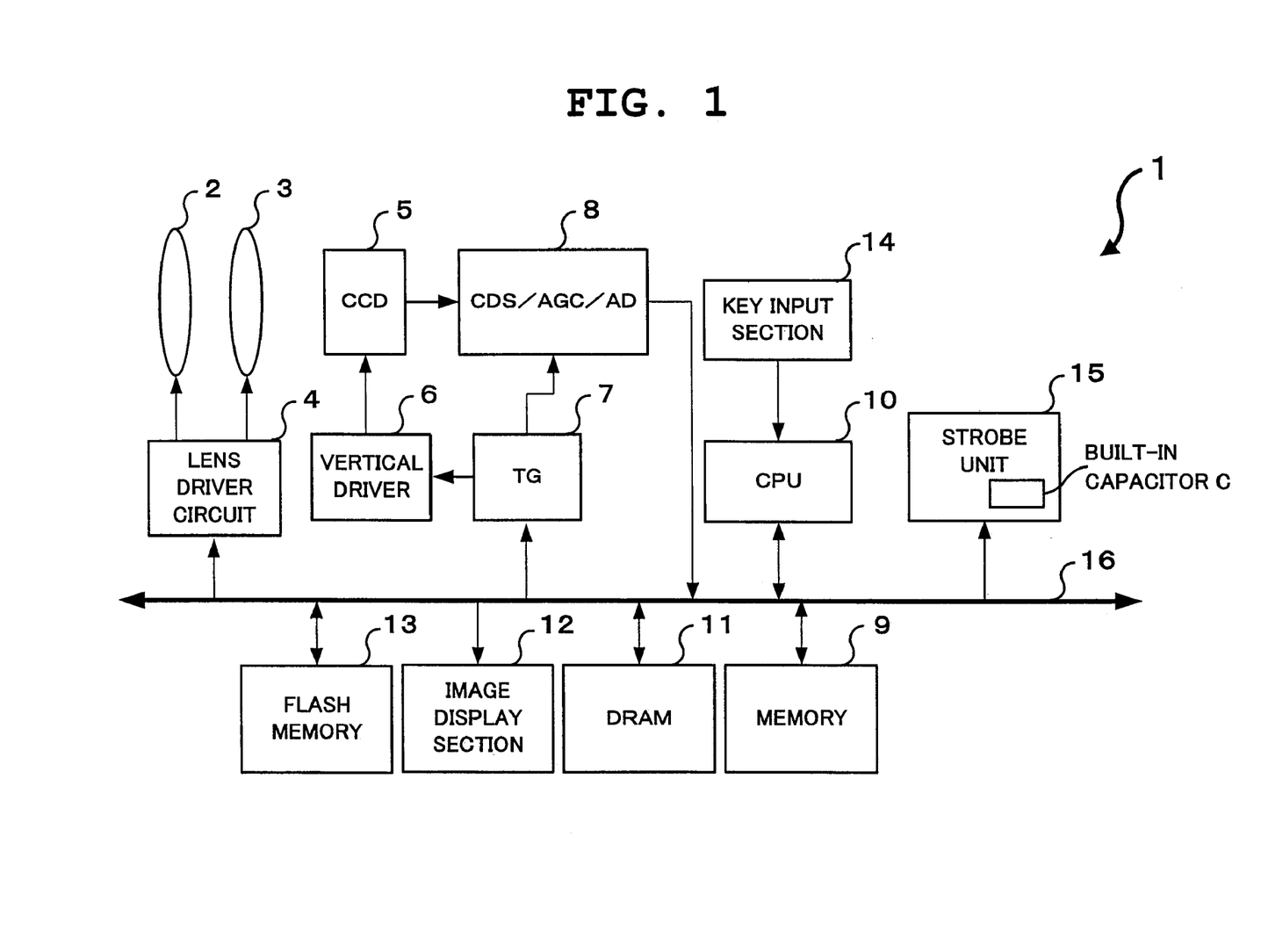
FIG. 1 is a block diagram of a digital camera in an embodiment of the present invention.

FIG. 1 is a block diagram showing the general electrical outline configuration of a digital camera 1 which actualizes the imaging apparatus of the present invention.

The digital camera 1 includes a focus lens 2, a zoom lens 3, a lens driver circuit 4, a CCD 5, a vertical driver 6, a timing generator (TG) 7, a pre-processing unit 8, a memory 9, a CPU 10, a DRAM 11, an image display section 12, a flash memory 13, a key input section 14, a strobe unit 15, and a bus 16.

The focus lens 2 and the zoom lens 3 are configured with a plurality of lens groups, and the lens driver circuit 4 is connected to the focus lens 2 and the zoom lens 3.

The lens driver circuit 4 is configured by motors (not shown) for moving the focus lens 2 and the zoom lens 3 in the axial directions thereof, respectively, and motor drivers (not shown) for driving the focus motor and the zoom motor, respectively, according to a control signal which is sent from the CPU 10.

The CCD 5, scan-driven by the vertical driver 6, photo-electrically converts the intensity of light of the respective colors in the RGB value of an object image at a constant cycle period, and outputs the intensity to the pre-processing unit 8 as imaging samples. The operation timing of the vertical driver 6 and the pre-processing unit 8 is controlled by the CPU 10 via the TG 7.

The TG 7 is connected with the pre-processing unit 8 which is configured with a correlated double sampling (CDS) circuit for performing correlated double sampling of imaging signals (image data) that is outputted from the CCD 5 and holding them, an automatic gain control (AGC) circuit for performing automatic gain control of the sampled imaging signals, and an analog to digital (A/D) converter for converting the automatic-gain-controlled analog imaging signals to digital signals. The imaging signals from the CCD 5 are sent as digital signals to the CPU 10 via the pre-processing unit 8.

The CPU 10 is a one-chip microcomputer which has functions of performing image processing including gamma (γ) correction processing, pixel interpolation processing, white balance processing, histogram generation processing, and generation processing of luminosity color difference signals (YUV signals) and the like and compression and expansion processing (for example, and compression and expansion in a joint photographic experts group (JPEG) format) to individual image data sent from the pre-processing unit 8, and which controls the individual sections of the digital camera 1.

Particularly in the present embodiment, the CPU 10 has functions of controlling start of flashing and flash time of the strobe unit 15, calculating an amount of flashing on the basis of a metering operation and the result thereof, and performing strobe consecutive shooting and brightness correction processing.

The memory 9 accommodates a control program necessary for controlling individual sections of the CPU 10 and necessary data, and the CPU 10 operates in accordance with the program.

In addition, the memory 9 records a correction coefficient table in which correction coefficients of flash time for individual number of images that are consecutively shot in the strobe consecutive shooting. The correction coefficient table will be described later. In addition, the memory 9 has a flash time storage area for storing the flash time of the strobe and a shooting number storage area for storing the number of shootings.

The DRAM 11 is used as a buffer memory for temporarily storing image data that is sent to the CPU 10 after imaged by the CCD 5, and is also used as a working memory for the CPU 10.

The image display section 12 includes a color liquid crystal display (LCD) and a driver circuit therefor. It displays the object imaged by the CCD 5 as a through image in the standby mode, and displays the image data which has been read out from the flash memory 13 and expanded while reproducing a recorded image.

The flash memory 13 is a storage medium for storing the image data or the like which has been picked up by the CCD 5.

The key input section 14 includes a plurality of operation keys, such as a shutter button and a mode selection key, and outputs operation signals corresponding to a key operation by a user to the CPU 10.

The strobe unit 15 includes a built-in capacitor C, a charging circuit (not shown), a flash circuit (not shown) including a xenon tube, a charged voltage detection circuit (not shown) of the capacitor C, not shown, and the like. The charging circuit charges an electric power to the built-in capacitor C, and the flash circuit supplies an electric charge in the built-in capacitor C to the xenon tube which serves as a light source, thereby flashing and firing light. The strobe unit 15 is controlled by the CPU 10 for the start of charging, flashing and flash time, and the strobe unit 15 performs flashing or the like according to the control. In addition, the charged voltage detection circuit in the strobe unit 15 sends a charged voltage it has detected to the CPU 10.

A-2. Operation of the Digital Camera 1

Figure 3:
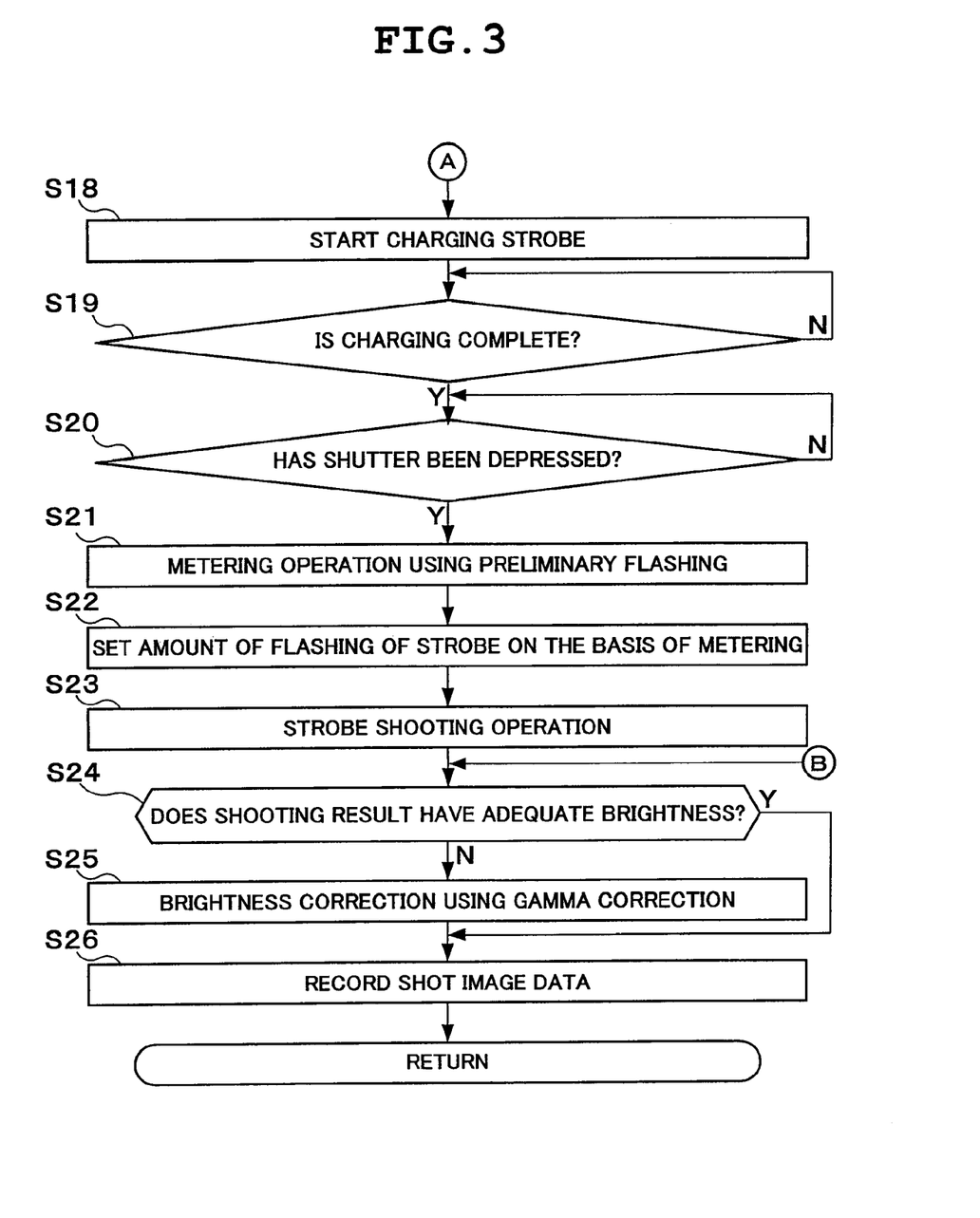
FIG. 3 is a flowchart showing an operation of the digital camera according to a modification.
Figure 4:
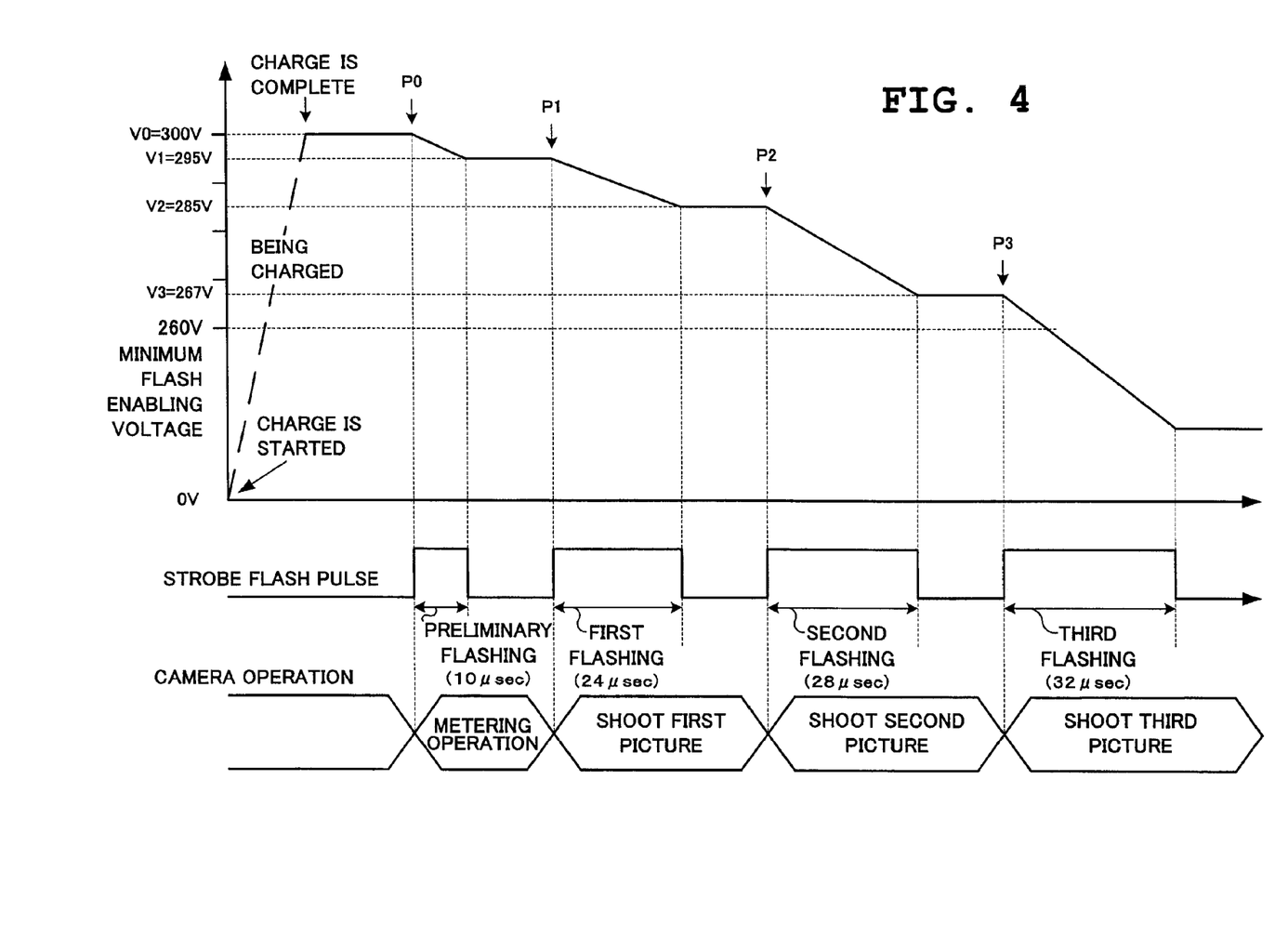
FIG. 4 is a time chart showing a voltage of a built-in capacitor C, a strobe flash pulse, and an operation of the camera in a strobe consecutive shooting mode.

Next, the operation of the digital camera 1 in the embodiment will be explained according to the flowcharts in FIGS. 2 and 3 and the time chart in FIG. 4. FIG. 4 is a time chart showing the voltage of the built-in capacitor C, a strobe flash pulse, and the operation of the camera in the strobe consecutive shooting mode.

When the mode is set to the strobe shooting mode by operation by a user of the mode selection key of the key input section 14, the CPU 10 starts a through image display in which the CCD 5 starts imaging an object, generates luminosity color difference signals from the image data acquired by the imaging, stores the generated image data in the luminosity color difference signals to the buffer memory (DRAM 11), and displays the stored image data of the object to the image display section 12 (Step S1).

Subsequently, the CPU 10 judges whether or not the strobe consecutive shooting mode has been selected by the user (Step S2). The judgment is made based on whether or not an operational signal corresponding to the operation of selecting the strobe consecutive shooting mode has been sent from the key input section 14. The strobe consecutive shooting mode herein refers to a mode for shooting an object consecutively (three times consecutively in this case) and flashing strobe light for each shooting.

If the CPU 10 judges in Step S2 that the strobe consecutive shooting mode has not been selected, the CPU 10 judges whether or not a strobe single shooting mode has been selected (Step S3). The judgment is made based on whether or not an operational signal corresponding to the operation of selecting the strobe single shooting mode has been sent from the key input section 14. The strobe single shooting mode herein refers to a mode for flashing strobe light and shooting an object once.

If the CPU 10 judges in Step S3 that the strobe single shooting mode has not been selected, the CPU 10 returns to Step S2.

On the other hand, if the CPU 10 judges in Step S2 that the mode has been set to the strobe consecutive shooting mode, the CPU 10 sends a control signal to the strobe unit 15, thereby starting a charging of the built-in capacitor C (Step S4). At this time, the charging circuit of the strobe unit 15 charges the built-in capacitor C in accordance with the control signal from the CPU 10.

After starting charging, the CPU 10 judges whether or not the charging is complete (Step S5). The judgment on whether or not the charging is complete is made based on charged voltage information sent from the charged voltage detection circuit of the strobe unit 15.

If the CPU 10 judges in Step S5 that the charging is not complete, the CPU 10 remains at Step S5 until the charging is complete. On the other hand, if the CPU 10 judges that the charging is complete, the CPU 10 judges whether or not the shutter button has been depressed (Step S6). The judgment is made based on whether or not an operational signal corresponding to the depression of the shutter button has been sent from the key input section 14.

It is apparent from FIG. 4 that the voltage of the built-in capacitor C increases upon the start of the charging, the charging is complete when the voltage of the built-in capacitor C has reached a certain voltage (which is assumed to be 300 V in this case), and the voltage does not increase further.

If the CPU 10 judges in Step S6 that the shutter button has been depressed, the CPU 10 sets the mode to a pixel addition drive mode (Step S7). At this time, the CPU 10 also sets the number of pixels to be added. The pixel addition drive mode refers to a mode for reading out an electric charge accumulated in the CCD 5 using pixel addition drive. For example, pieces of pixel information for a plurality of lines are added for each row, and a signal acquired by the addition is outputted from the CCD 5 as a signal corresponding to one pixel.

The reason for setting the mode to the pixel addition drive mode is as follows. When a consecutive shooting (continuous shooting) is performed, the voltage of the built-in capacitor C is split into three for flashing strobe light, which may lead to an insufficient amount of flashing. This insufficient amount of flashing can be compensated by reading out the electric charge accumulated in the CCD 5 using the pixel addition drive mode. At the same time, the frame rate can be enhanced by increasing an electric charge read-out rate of the CCD 5, thereby enabling faster consecutive shooting.

Subsequently, the CPU 10 performs a metering operation using preliminary flashing (Step S8). That is, the CPU 10 performs processing of preliminary flashing strobe light by sending a control signal to the strobe unit 15, and at the same time having the CCD 5 perform a shooting (electric charge accumulation) operation and subsequently reading out the electric charges accumulated in the CCD 5 using the pixel addition drive. Because of preliminary flashing in this case, the flash time is shorter than that during the strobe shooting, and it is assumed to be 10 μsec in this case.

It is apparent from FIG. 4 that during the metering operation the CPU 10 sends the control signals on the start of flashing and flash time (i.e., strobe flash pulse) to the strobe unit 15, the flush circuit in the strobe unit 15 fires light by discharging electric charges in the built-in capacitor C, and therefore, the voltage in the built-in capacitor C has dropped from 300 V to 295 V.

Subsequently, the CPU 10 calculates the amount of flashing of the strobe light to be flashed on the basis of the result of the metering operation (Step S9).

The calculation of the amount of flashing is made on the basis of the average value of the luminosity of the image data (or a part of the image data) which has been read out by the pixel addition drive and is made so as to calculate the amount of flashing of strobe light to be flashed with which an appropriate exposure is acquired. Furthermore, in this case, a strobe flash time of the first picture (or the first shooting) which provides the calculated amount of flashing is calculated and stored in the flash time storage area in the memory 9.

Subsequently, the CPU 10 judges whether or not the strobe consecutive shooting is possible with the calculated amount of flashing (Step S10). That is, since shootings are performed three times consecutively in the strobe consecutive shooting, the CPU 10 judges whether or not the voltage corresponding to the amount for flashing strobe light three times consecutively is accumulated in the built-in capacitor C.

In this case, it is judged whether or not the first strobe flash time calculated in Step S9 is equal to or smaller than a limit value (which is assumed to be 24 μsec in this case). If the first strobe flash time is judged to be equal to or smaller than 24 μsec, it is judged that the voltage corresponding to the amount for flashing strobe light three times consecutively with the calculated amount of flashing is accumulated in the built-in capacitor C.

The reason why the judgment on whether or not it is possible to flash three times consecutively with the calculated amount of flashing is made based on whether or not the first flash time is equal to or smaller than 24 μsec will be specifically described as below.

Supposing that shooting is performed three times consecutively with a uniform amount of flashing, the voltage in the capacitor C drops after each flashing. Therefore, to achieve three consecutive flashings with a uniform amount of flashing, the flash time need be longer as the number of flashings increases. The flash time of the strobe light for each shooting can be determined by the correction efficient table accommodated in the memory 9, and the flash time t of strobe light for each shooting is determined by the equation, t=correction coefficient×the first flash time.

Figure 5A:
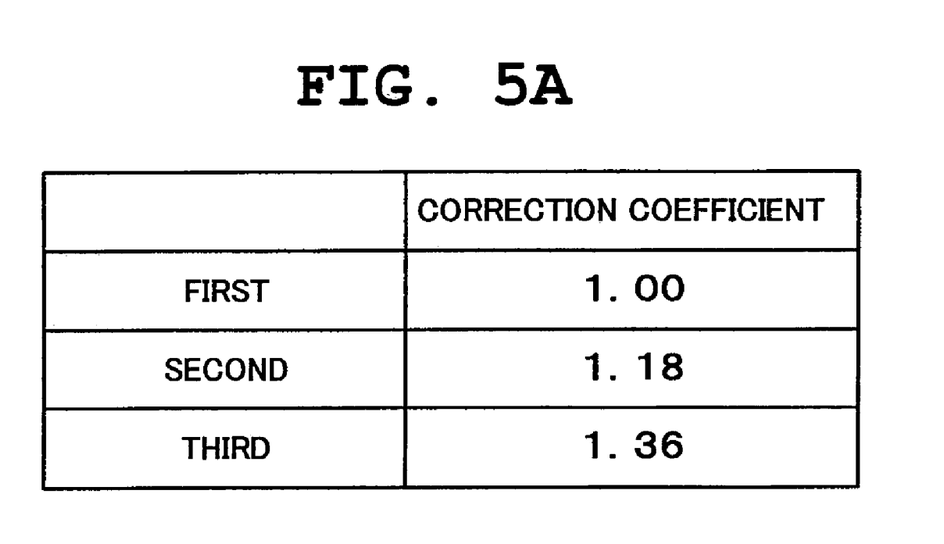
FIG. 5A is a diagram showing the state of a correction coefficient table.
Figure 5B:
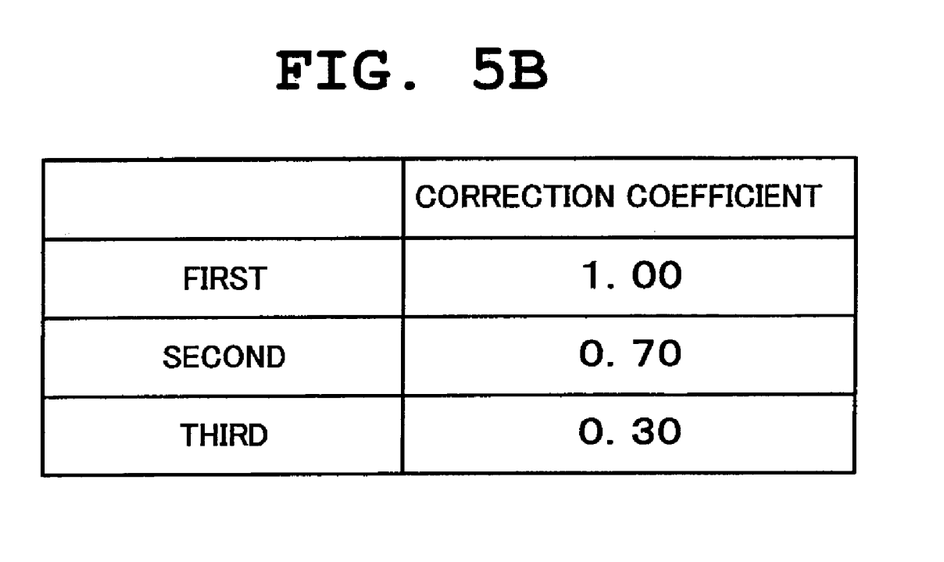
FIG. 5B is a diagram showing the state of the correction coefficient table.

FIGS. 5A and 5B show the states of the correction coefficient tables accommodated in the memory 9.

It is understood from FIG. 5A that since the correction coefficient for the first flash time is 1.00, the first flash time shall be 1.00×the first flash time. Since the correction coefficient for the second flash time is 1.18, the second flash time shall be 1.18×the first flash time. Further, since the correction coefficient for the third flash time is 1.36, the third flash time shall be 1.36×the first flash time.

It goes without saying that the correction coefficients are provided in such a manner that the amounts of flashing do not vary for individual shootings, although the flash times for each shooting are varied by the correction coefficients.

In addition, with reference to FIG. 4, the minimum flash enabling voltage is 260 V, which refers to the minimum voltage required for performing the third flashing.

According to the circumstance as described above, if the first flash time is obtained, the second flash time will also be determined, whereby the voltage of the built-in capacitor C will also be determined when the second flash ends.

For example, in the case where the first strobe flash time is 28 μsec, the second strobe flash time will be approximately 33 μsec, and the voltage of the built-in capacitor C during the third strobe flashing (when the second strobe flashing ends) will be 256 V. Accordingly, it is not possible to perform the third strobe flashing. On the other hand, in the case where the first strobe flash time is 24 μsec, the second strobe flash time will be approximately 28 μsec, and the voltage of the built-in capacitor during the third strobe flash will be 267 V. Accordingly, it is possible to perform the third strobe flashing.

In this case, therefore, judgment on whether or not it is possible to flash strobe light three times consecutively with a uniform amount of flashing is made based on whether or not the first strobe flash time is equal to or smaller than 24 μsec. Note that in FIG. 4, an example is shown of a case in which recharging of the built-in capacitor C is being stopped after the built-in capacitor is charged and at least until a series of consecutive strobe shootings end.

If the CPU 10 judges in Step S10 that the strobe consecutive shooting is not possible with the calculated amount of flashing, that is, if it judges that the first flash time is not equal to 24 μsec or less, the CPU 10 limits the amount of flashing of strobe light for the first picture to 24 μsec (Step S11) and proceeds to Step S12. That is, if the CPU 10 judges that the first flash time is not 24 μsec or less, it updates what is stored in the flash time storage area in the memory 9 to 24 μsec.

On the other hand, if the CPU 10 judges that the strobe consecutive shooting is possible with the calculated amount of flashing, that is, if it judges that the first flash time is equal to or smaller than 24 μsec, the CPU 10 proceeds to Step S12 as it is.

When the CPU 10 proceeds to Step S12, the CPU 10 determines the amount of flashing on the basis of the flash time stored in the memory 9 as the absolute amount of flashing.

In other words, in the case where the flash time (which is proportional to the amount of flashing) calculated in Step S9 is 24 μsec or less, the CPU 10 determines the calculated flash time as the absolute amount of flashing. On the other hand, in the case where the flash time calculated in Step S9 is longer than 24 μsec, the CPU 10 determines 24 μsec as the absolute amount of flashing.

At this time, the CPU 10 sets the number of shootings n to 1, that is, stores 1 in the shooting number storage area in the memory 9. In this case, it is assumed that the flash time which has been determined is 24 μsec.

Subsequently, the CPU 10 performs correction of the strobe flash time (Step S13). The correction is performed by reading out the correction coefficient corresponding to the number of shootings (the number of times) stored in the shooting number storage area in the memory 9 and multiplying the read-out correction coefficient and the determined flash time (i.e., the flash time stored in the flash time storage area).

In this case, since the determined flash time is 24 μsec and the stored number of shootings is 1, the correction coefficient corresponding to the first picture shall be 1.00. Accordingly on the basis of 24 μsec×1.00, the flash time after the correction shall be 24 μsec.

Subsequently, the CPU 10 sets the flash time after the correction as the strobe flash time (Step S14), and performs a strobe shooting operation (an operation of exposing the CCD 5 and an operation of flashing the strobe unit 15) on the basis of the set strobe flash time (Step S15). Note that in the strobe shooting operation, electric charges accumulated in the CCD 5 are read out by the pixel addition drive, and still-image data acquired by the strobe shooting is stored in the buffer memory.

Subsequently, the CPU 10 judges whether or not strobe shooting has been performed three times (Step S16). If the CPU 10 judges that strobe shooting has not been performed three times, the CPU 10 increments the number of shootings n (Step S17) and returns to Step S13. On the other hand, if the CPU 10 judges in Step S16 that strobe shooting has been performed three times, the CPU 10 proceeds to Step S24.

The judgment on whether or not strobe shooting has been performed three times is made based on whether or not the number stored in the shooting number storage area has reached 3. In addition, the number of shootings n is incremented by storing the number which is determined by adding +1 to the number stored in the shooting number storage area.

On the other hand, if the CPU 10 judges in Step S3 that the mode is set to the strobe single shooting mode, the CPU 10 sends a control signal to the strobe unit 15, thereby starting charging of the built-in capacitor C (Step S18).

After starting charging, the CPU 10 judges whether or not charging is complete (Step S19).

If the CPU 10 judges in Step S19 that charging is not complete, the CPU 10 remains at Step S19 until charging is complete. If the CPU 10 judges that charging is complete, the CPU 10 judges whether or not the shutter button has been depressed (Step S20).

If the CPU 10 judges in Step S20 that the shutter button has not been depressed, the CPU 10 remains at Step S20 until the shutter button is depressed. When the shutter button is depressed, the CPU 10 performs a metering operation using preliminary flashing (Step S21). During the metering operation, pixel addition drive is not performed. Instead, pixels in the CCD 5 are read out by an ordinary read-out drive (such as all-pixels read-out drive and part of pixels read-out drive).

Subsequently, the CPU 10 sets the amount of flashing with which appropriate exposure is achieved on the basis of the result of the metering operation (Step S22), performs a strobe shooting operation on the basis of the set amount of flashing (Step S23), and proceeds to Step S24. Note that in the strobe shooting operation, electric charges accumulated in the CCD 5 are read out by an ordinary read out drive, and still image data acquired by the strobe shooting is stored in the buffer memory.

Figure 2:
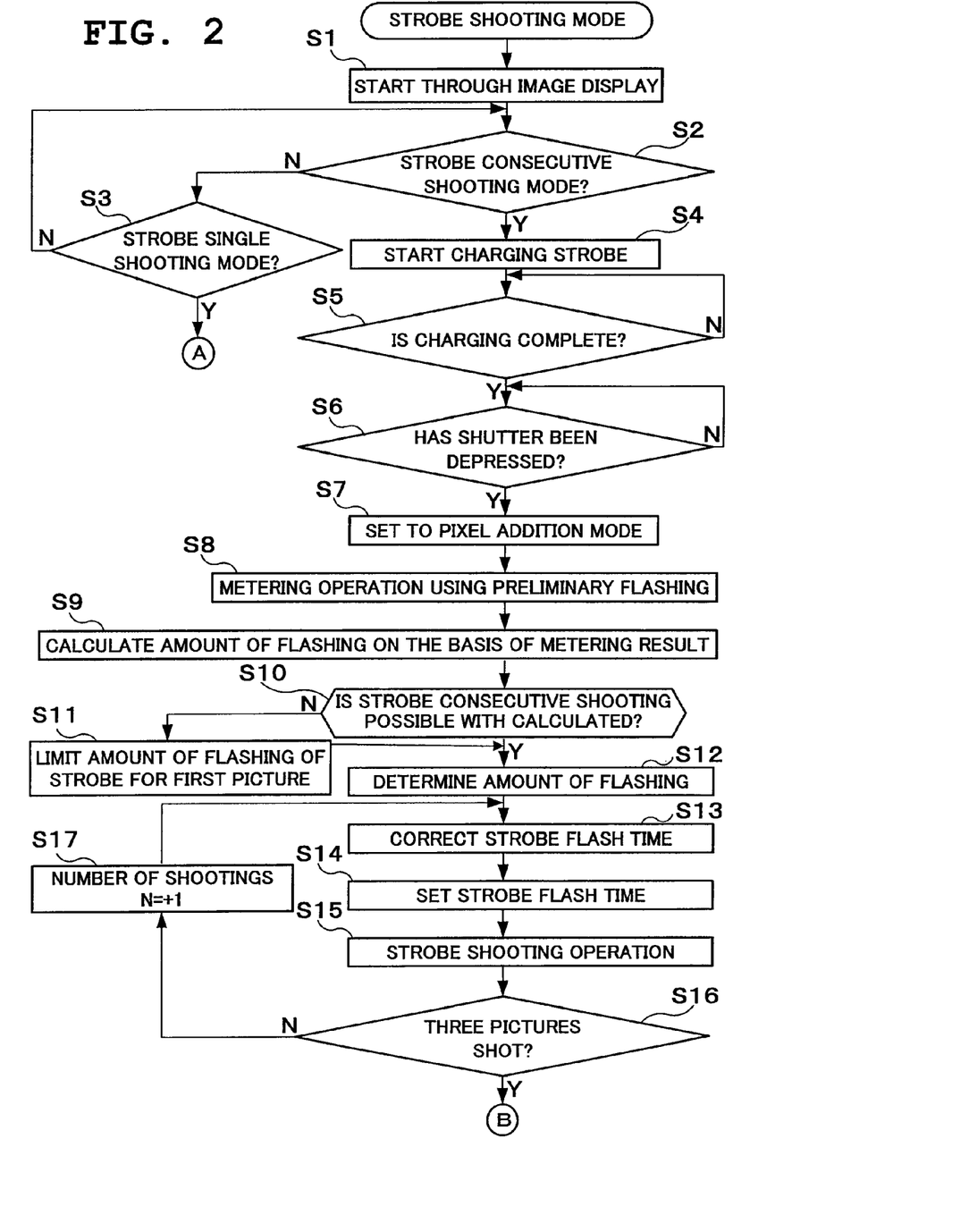
FIG. 2 is a flowchart showing an operation of the digital camera according to the embodiment.

Note that if the case where the metering operation is performed in the strobe consecutive shooting mode is compared with the case where the metering operation is performed in the strobe single shooting mode under the same shooting conditions, the amount of flashing calculated in Step S9 in FIG. 2 on the basis of the result of the metering operation is smaller than the amount of flashing set in Step S22 on the basis of the result of the metering operation. This is because the image data in the CCD 5 is read out by pixel addition drive in the strobe consecutive shooting mode, whereby luminosity of the whole image has increased.

When the CPU 10 proceeds to Step S24, the CPU 10 judges whether or not the still image data (Bayer data) acquired by the strobe shooting has adequate brightness. In the case where a plurality of still image data is acquired by the strobe consecutive shooting, the CPU 10 judges whether or not the individual still image data that has been acquired has adequate brightness.

The CPU 10 performs brightness correction using gamma correction to the still image data in the Bayer data format which has been judged in Step S24 not to have adequate brightness (Step S25), and records the still image data in the flash memory 13. At this time, when recording still image data, the CPU 10 performs image processing such as processing of generating luminosity color difference signals, compresses the processed image data and records the compressed data.

On the other hand, the CPU 10 records the still image data in the Bayer data format which has been judged to have adequate brightness in Step S24 in the flash memory 13 as they are. Also in this case, when recording still image data, the CPU 10 performs image processing such as processing of generating luminosity color difference signals, compresses the processed image data and records the compressed data.

An example of the judgment on whether or not the still image data has adequate brightness, and of the method of correcting brightness using gamma correction will be briefly described hereafter.

The judgment on whether or not the still image data has adequate brightness is made by generating a histogram for each RGB from the Bayer data, which is the still image data acquired by the shooting, and detecting a level at which a high luminosity ratio is achieved for each RGB (for example, the level at which 3% from the high luminosity end is achieved). Next, judgment is made by selecting the highest value among the levels at which the high luminosity ratios are achieved for each RGB (hereinafter referred to as peak levels). If the selected value is higher than a threshold, it is judged that the still image data has adequate brightness.

Figure 6A:
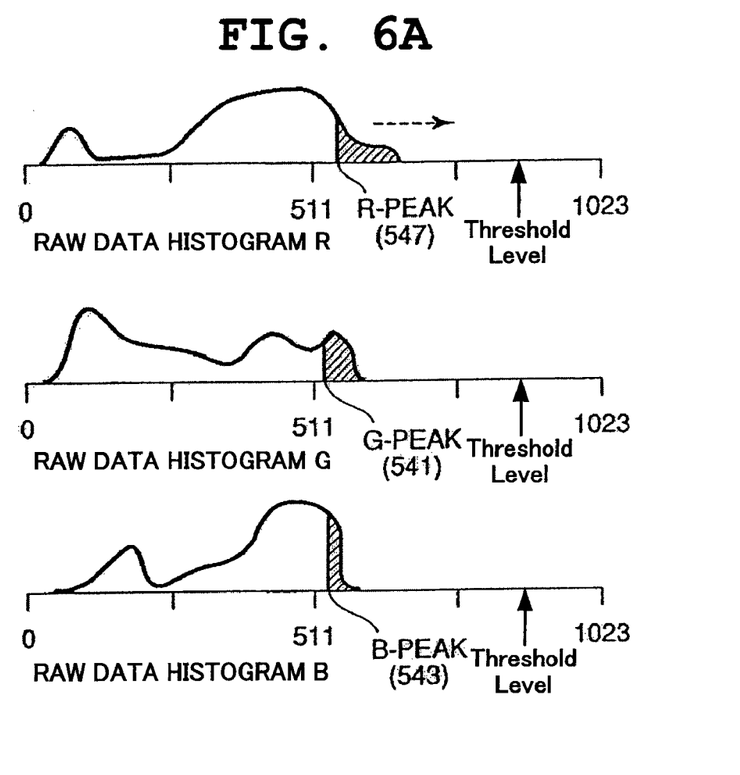
FIG. 6A is a diagram for describing judgment on whether or not the image data has adequate brightness and brightness correction using gamma correction.

FIG. 6A shows a histogram generated for each RGB with the left side being "black" and the right side being "white". Each histogram is represented by 10-bit digital values (1024 values).

A shaded portion in the histogram for each RGB shows a portion until 3% is achieved starting from the high luminosity end, and the portion at which the exact 3% is achieved is considered as the peak level. The peak levels for individual RGBs shall be set as R-PEAK, G-PEAK and B-PEAK, respectively.

For example, when it is assumed that R-PEAK=547, G-PEAK=541 and B-PEAK=543 in FIG. 6A, the highest value will be R-PEAK=547.

In FIG. 6A, since the highest value R-PEAK=547 is not higher than the threshold, it is judged that the still image data does not have brightness.

Figure 6B:
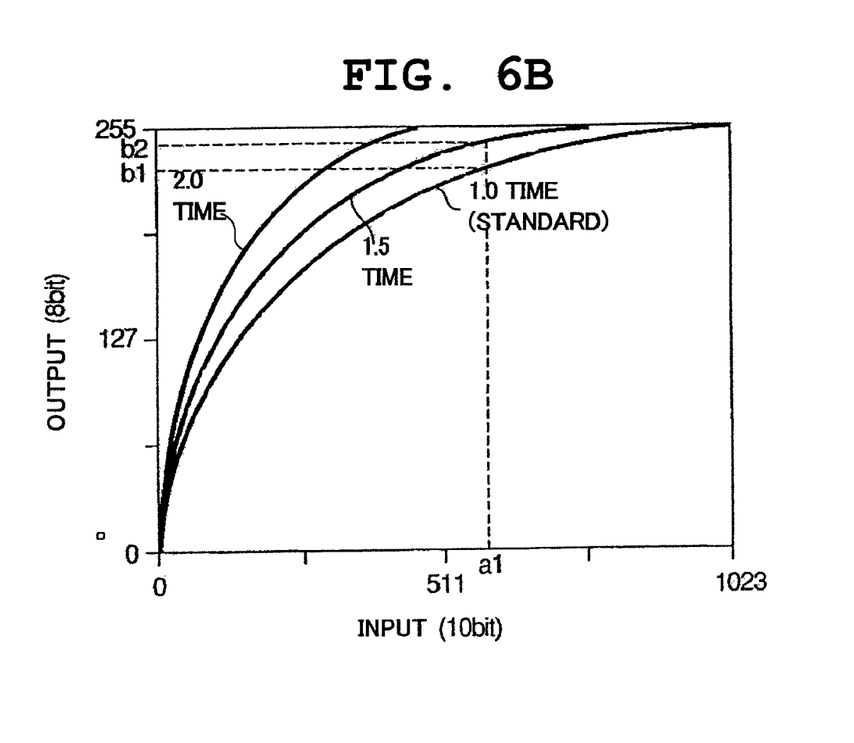
FIG. 6B is a diagram for describing gamma correction processing.

Subsequently, the method for correcting brightness using gamma correction calculates a correction ratio which makes the selected highest value the threshold. As shown in FIG. 6B, the gamma curve of 1.0 time has been determined in advance as the standard. With respect to this standard, the curve is changed in a manner to reduce the input range, corresponding to the correction ratio such as 1.5 times or 2.0 times. Accordingly, for example, from a gamma curve whose correction ratio has been changed to 1.5 times, an output value b2 is obtained for an input value a1. That means that a value of higher brightness can be obtained than an output value b1 obtained from the standard curve.

A-3. Effects

As described above, in the present embodiment, judgment is made on whether or not strobe flashing is possible three times consecutively with the amount of flashing calculated on the basis of the result of the metering operation. In the case where it is judged that consecutive strobe flashing is possible, strobe consecutive shooting is performed with the calculated amount of flashing. Accordingly, image data free from insufficient exposure can be acquired without image quality being deteriorated.

On the other hand, in the case where consecutive strobe flashing is not possible, the amount of flashing of the strobe is limited to the largest possible value within the range of the amounts with which consecutive strobe shooting is possible, and strobe consecutive shooting is performed with the limited amount of flashing. Accordingly, it is possible to prevent insufficient exposure as much as possible without the image quality being deteriorated.

In addition, in the case where the mode is set to the strobe consecutive shooting mode, the metering operation is performed after the driving of the CCD 5 is set to the pixel addition drive, and the amount of flashing is calculated on the basis of the result of the metering operation. Accordingly, the luminosity of the whole image data which has been read out from the CCD 5 increases, thereby decreasing the calculated amount of flashing. In addition, since it is possible to decrease the calculated amount of flashing, the judgment that strobe consecutive shooting is not possible with the calculated amount of flashing is made less frequently, whereby it is more likely that the image data free from insufficient amount of light is achieved.

In addition, since the strobe shooting is performed by pixel addition drive, luminosity of the whole image data acquired by shooting increases, whereby it is more likely that the image data free from insufficient amount of light is achieved.

In addition, it is judged whether or not individual image data has adequate brightness, and then brightness correction using gamma correction is made on image data which does not have adequate brightness. Accordingly, it is possible to acquire image data free from insufficient exposure. In addition, even in the case where brightness correction is to be performed to image data, acquiring the image data with the largest possible amount of flashing within the range of amounts with which strobe consecutive shooting is possible. Therefore, the brightness need not be corrected that much, and it is possible to prevent the image quality from being deteriorated as much as possible.

B. Modification

The above-described embodiment may have modifications as described below.

(1) In the above-described embodiments, three consecutive strobe shootings are performed when the mode is set to the strobe consecutive shooting mode. The number of consecutive shootings is not limited to three, and any number is accepted. Further, a user may set an arbitrary number of strobe consecutive shootings by the key operation.

In this case, the limit value is provided corresponding to the number of pictures to be consecutively shot, and judgment on whether or not strobe consecutive shooting is possible based on whether or not the calculated strobe flash time is larger than the limit value.

(2) In addition, in the embodiment as described above, the mode is set to the pixel addition drive mode when the mode is set to the strobe consecutive shooting mode. Alternatively, the mode may be set to the pixel addition drive mode, only in the case where it is judged that strobe consecutive shooting is not possible with the calculated amount of flashing.

In the case where the strobe consecutive shooting is not possible with the calculated amount of flashing, the amount of flashing of the strobe is limited and thus adequate amount of exposure cannot be acquired. Accordingly, luminosity of the whole image data can be enhanced by pixel addition drive, whereby a bright image can be achieved. On the other hand, in the case where the strobe consecutive shooting is possible with the calculated amount of flashing, strobe consecutive shooting is possible by an ordinary drive which is not the pixel addition drive, whereby a bright image can be acquired.

In this case, in the metering operation using preliminary flashing in Step S8 in FIG. 2, image data in the CCD 5 is read out by an ordinary drive rather than pixel addition drive.

Figure 7:
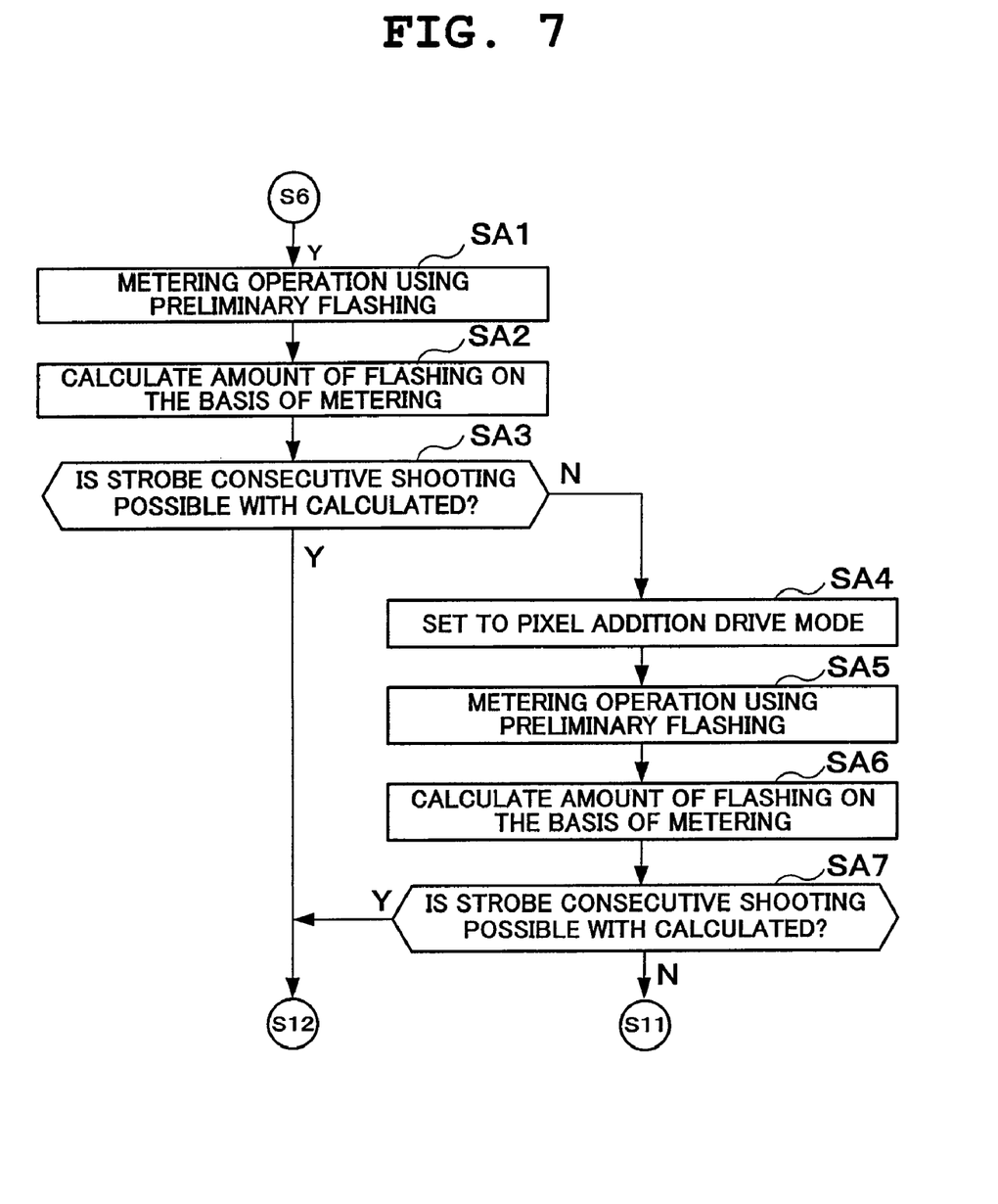
FIG. 7 is a flowchart showing an operation of a digital camera in a modification of the present invention.

Hereafter, the flowchart in FIG. 7 will be described. The description of the operations which is overlapped with the description referring to the above-described FIG. 2 and FIG. 3 will be omitted.

When the CPU 10 judges in Step S6 in FIG. 2 that the shutter button has been depressed, it performs the metering operation using preliminary flashing (Step SA1). Note that in the modification, the mode has not been set to the pixel addition drive mode at this time.

Subsequently, the CPU 10 calculates the amount of flashing of strobe light to be flashed on the basis of the result of the metering operation (Step SA2). That is, the CPU 10 calculates the amount of flashing of light to achieve appropriate exposure to the image data which has been read out in an ordinary read out-mode in which pixels are not added.

Subsequently, the CPU 10 judges whether or not strobe consecutive shooting is possible with the calculated amount of flashing (Step SA3). That is, it judges whether or not the voltage corresponding to the amount for flashing strobe light three times consecutively with the calculated amount of flashing is accumulated in the built-in capacitor C.

For example, the CPU 10 judges whether or not the first strobe flash time calculated in Step SA2 is equal to or smaller than a limit value (which is assumed to be 24 μsec herein). If the CPU 10 judges that the limit value is equal to or smaller than 24 μsec, the CPU 10 judges that the voltage corresponding to the amount for flashing strobe light three times consecutively with the calculated amount of flashing is accumulated in the built-in capacitor C. The CPU 10 proceeds to Step S12 in FIG. 2 as described above, remaining in the ordinary read-out mode in which pixels are not added.

On the other hand, at Step SA3, if the CPU 10 judges that strobe consecutive shooting is not possible with the calculated amount of flashing, that is, if it judges that the first flash time is not 24μ or less, the CPU 10 sets the mode to the pixel addition drive mode (Step SA4).

Next, the CPU 10 again performs the metering operation using preliminary flashing in the state of the pixel addition drive mode (Step SA5).

Subsequently, the CPU 10 calculates the amount of flashing of strobe light to be flashed on the basis of the result of the metering operation (Step SA6). That is, it calculates the amount of flashing to achieve appropriate exposure to the image data which has been read out from the pixel addition drive mode.

Subsequently, the CPU 10 judges that whether or not strobe consecutive shooting is possible with the calculated amount of flashing (Step SA7). That is, it judges whether or not the voltage corresponding to the amount for flashing strobe light three times consecutively with the calculated amount of flashing is accumulated in the built-in capacitor C.

For example, the CPU 10 judges whether or not the first strobe flash time calculated in Step SA6 is equal to or smaller than a limit value (which is assumed to be 24 μsec herein). If the CPU 10 judges that the flash time is 24 μsec or less, the CPU 10 judges that the voltage corresponding to the amount for flashing strobe light three times consecutively with the calculated amount of flashing is accumulated in the built-in capacitor C, and proceeds to Step S12 in FIG. 2 as described above, while remaining in the pixel addition drive mode.

On the other hand, also in Step SA6, if the CPU 10 judges that strobe consecutive shooting is not possible with the calculated amount of flashing, that is, if the CPU 10 judges that the first flash time is not 24 μsec or less, the CPU 10 limits the amount of flashing of strobe light for the first picture to 24 μsec, and proceeds to the Step SA11 in FIG. 2 as described above, while remaining in the pixel addition drive mode.

The modification enables preventing the pixel addition drive mode from being set unnecessarily.

(3) Furthermore, in the embodiment as described above, there is provided a correction coefficient which makes the amounts of exposure (the amounts of flashing) for the first to third pictures uniform. Alternatively, a correction coefficient table which brackets the amounts of exposure may be provided, and strobe shooting may be performed by bracketing the amount of exposure for the first to third pictures by using the correction coefficient.

FIG. 5B shows the state of the correction coefficient table enabling bracketing the exposure. It is apparent from the correction coefficient in FIG. 5B that the correction coefficient decreases gradually. Accordingly, when the correction coefficient table is used for the strobe shooting, it is possible to perform bracketing shooting in which the amount of exposure gradually decreases.

In this case, a limit value corresponding to the bracketing amount is provided, and judgment on whether or not strobe bracketing shooting is possible is made based on whether or not the calculated strobe flash time is larger than the limit value.

(4) Furthermore, in the embodiment as described above, only one correction coefficient table is provided. Alternatively, a plurality of correction efficient tables that have different correction coefficients depending on the flash time for the first picture may be provided.

(5) Furthermore, in the embodiment as described above, the flash times for the second and third pictures are corrected by multiplying the correction coefficient on the basis of the flash time for the first picture. Alternatively, the value of the correction coefficient may be finely adjusted corresponding to the voltage of the built-in capacitor C immediately after the strobe shooting for the first and second pictures.

(6) Furthermore, in the embodiment as described above, it is judged whether or not individual image data acquired by shooting has adequate brightness, and then brightness correction using gamma correction is performed for the image data which is judged not to have adequate brightness. Alternatively, brightness correction using gamma correction may be performed to the three image data acquired by strobe consecutive shooting, only in the case where it is judged in Step S10 that strobe consecutive shooting is not possible with the calculated amount of flashing.

(7) Furthermore, the embodiment may be modified to combination of any of the modifications (1) to (6) as described above.

(8) Still further, the digital camera 1 in the above-described embodiment is not limited to the embodiment as described above. It may be a cell phone with camera, a PDA with camera, a PC with camera, an IC recorder with camera or a digital video camera, or any apparatus capable of strobe consecutive shooting.

While the present invention has been described with reference to the preferred embodiments, it is intended that the invention be not limited by any of the details of the description therein but includes all the embodiments which fall within the scope of the appended claims.

What is claimed is:
1. An imaging apparatus comprising:
an image pickup element for converting light of an object to image data;
a strobe for flashing and firing light;
a shooting unit which performs strobe shooting using the image pickup element and the strobe;
a calculation unit which calculates an amount of flashing of the strobe with which appropriate exposure is obtained during the strobe shooting performed by the shooting unit;
a judgment unit which judges whether it is possible for the strobe to flash consecutively for a certain number of times with the amount of flashing calculated by the calculation unit; and a shooting control unit which, when the judgment unit judges that it is possible for the strobe to flash consecutively for a certain number of times with the amount of flashing calculated by the calculation unit, controls the shooting unit to execute consecutive strobe shooting for the certain number of times, and which, in a case in which the judgment unit judges that it is not possible for the strobe to flash consecutively for the certain number of times with the amount of flashing calculated by the calculation unit, controls the shooting unit to drive the image pickup element by pixel addition.

2. The imaging apparatus according to claim 1, wherein the shooting control unit controls the shooting unit to execute consecutive strobe shooting for the certain number of times in such a manner that an amount of flashing of the strobe is a largest amount and is within a range of amounts of flashing with which consecutive flashing for the certain number of times is possible.

3. The imaging apparatus according to claim 1, comprising:
   a built-in capacitor which can be charged to a certain voltage;
   wherein the strobe flashes based on an electric charge supplied from the built-in capacitor, and
   the shooting unit controls the amount of flashing of the strobe based on a flash luminosity as a charged battery voltage of the built-in capacitor and a flash time as a supply time of the electric charge supplied from the built-in capacitor to the strobe.

4. The imaging apparatus according to claim 3, wherein the shooting unit charges the built-in capacitor, and stops charging of the built-in capacitor after charging the built-in capacitor at least until a series of consecutive strobe shooting ends.

5. The imaging apparatus according to claim 1, wherein the shooting control unit includes a unit which preliminarily flashes the strobe with a certain amount of flashing, and controls the shooting unit to execute preliminary strobe shooting for acquiring image data using the image pickup element, and
   wherein the calculation unit calculates the amount of flashing of the strobe with which appropriate exposure is obtained during the strobe shooting, based on the image data acquired by the preliminary strobe shooting.

6. The imaging apparatus according to claim 1, further comprising:
   a brightness correction unit which performs brightness correction processing using gamma correction processing on individual image data acquired by the strobe shooting, in a case in which the judgment unit judges that it is not possible for the strobe to flash consecutively for the certain number of times with the amount of flashing calculated by the calculation unit, and the shooting unit has executed consecutive strobe shooting for the certain number of times with the amount of flashing with which the consecutive flashing for the certain number of times is possible.

7. The imaging apparatus according to claim 1, further comprising:
   a second shooting control unit which controls the shooting unit to execute consecutive strobe shooting for the certain number of times based on the amount of flashing calculated by the calculation unit, when the judgment unit judges that it is possible for the strobe to flash consecutively for the certain number of times with the amount of flashing calculated by the calculation unit.

8. An imaging method comprising:
   performing strobe shooting using an image pickup element for converting light of an object to image data and a strobe for generating a flashing emission of light;
   calculating an appropriate amount of flashing of the strobe to acquire an appropriate exposure during the strobe shooting; and
   judging whether the strobe can achieve consecutive flashing for only a certain number of times with the calculated appropriate amount of flashing; and
   wherein, when it is judged that the strobe can achieve consecutive flashing for only the certain number of times with the calculated appropriate amount of flashing, the consecutive strobe shooting is executed only for the certain number of times with the calculated appropriate amount of flashing, and, when it is judged that the strobe cannot achieve consecutive flashing for only the certain number of times with the calculated appropriate amount of flashing, the image pickup element is driven by pixel addition.

* * * * *